United States Patent [19]

Jackson

[11] Patent Number: 4,823,505

[45] Date of Patent: Apr. 25, 1989

[54] FUMIGATION SYSTEM FOR EXTERMINATING INSECTS IN AN EXISTING BUILDING

[76] Inventor: John C. Jackson, 313 S. Lakeside Dr., Lake Worth, Fla. 33460

[21] Appl. No.: 52,290

[22] Filed: May 21, 1987

[51] Int. Cl.$^4$ .......................... A01M 7/00; A01M 1/20
[52] U.S. Cl. ..................................................... 43/124
[58] Field of Search .......................... 43/124; 239/271; 52/101, 302, 220, 221, 787, 743

[56] References Cited

U.S. PATENT DOCUMENTS

| | | | |
|---|---|---|---|
| 2,319,410 | 5/1943 | Leary | 52/302 |
| 3,513,586 | 5/1970 | Meyer | 43/124 |
| 3,676,949 | 7/1972 | Ramsey | 43/124 |
| 3,782,026 | 1/1974 | Bridges | 43/124 |
| 4,001,989 | 1/1977 | Fischer | 52/743 |
| 4,028,841 | 6/1977 | Lundwall | 43/124 |
| 4,648,202 | 3/1987 | Renth | 43/124 |
| 4,742,641 | 5/1988 | Getti | 43/124 |

Primary Examiner—Kurt Rowan
Attorney, Agent, or Firm—John H. Faro

[57] ABSTRACT

This invention relates to a novel system for exterminating insects in a building, and particularly, to such a system which may be installed after the building is completed. This system includes a tunnel device which provides access to the cavity between the interior and exterior walls of a building. The installation of this device in the interior wall of an existing building provides more effective access of fumigant to pests which may be living in the space between the interior and exterior walls. This tunnel device can be concealed from view or provided with a decorative cover plate. The other component of this system includes a reservoir of fumigant which can be matingly engaged with the tunnel device and dispense and effective dosage of pesticide into the cavity between the interior and exterior walls.

12 Claims, 3 Drawing Sheets

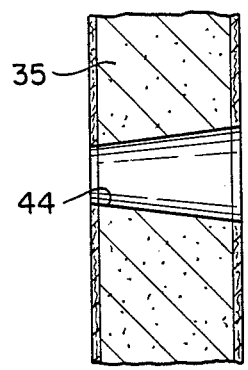
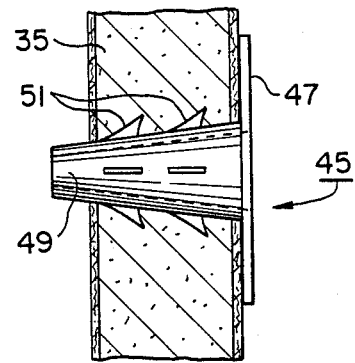
FIG.3   FIG.4
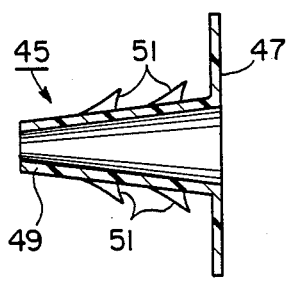
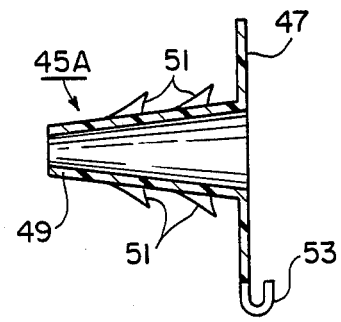
FIG.5   FIG.6
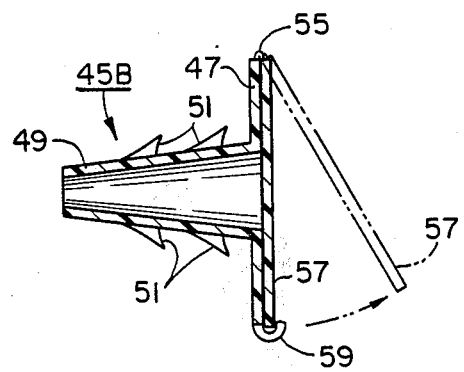
FIG.7

1

FUMIGATION SYSTEM FOR EXTERMINATING INSECTS IN AN EXISTING BUILDING

BACKGROUND OF THE INVENTION

1. Field of the Invention

This invention relates to a novel system for exterminating insects in an existing building, and particularly to such a system which may be installed after the building has been built.

2. Description of the Prior Art

All over the world, insects are undesirable inhabitants in homes, commercial buildings and industrial buildings for many obvious reasons. As a result, many systems have been suggested to rid these buildings of such insects. In Florida, where the climate is both warm and humid, insects invade the buildings, even when all of the outside walls and foundations are made of concrete and their outside walls are sealed on the outside surfaces.

Contemporary methods of exterminating infestations of insects in homes and places of business include spraying the perimeters of the rooms and the buildings with insecticide, and/or fogging the rooms and even the entire building with insecticide. Such methods are temporary, only partially successful and involve a great waste of time, money and chemicals.

It is a fact that cockroaches, silver fish, palmetto bugs, etc. live and multiply in the walls of the buildings. Spraying the baseboards and the perimeters of the rooms, and/or fogging entire rooms only reaches a small part of the insect population. Insects simply return to their nests in and between the interior and exterior walls of the buildings, deep in the structure of the building where they are protected from such insecticide treatment and continue to live and multiply.

Other contemporary methods attempt to prevent invasion by insects by applying liquid insecticides to the foundation below the grade through hollows in the concrete block foundation wall, as described for example, in U.S. Pat. Nos. 2,915,848 to J. H. Giffen and 3,513,586 to G. P. Meyer et al. Such insecticides are only partially successful in providing a barrier to the invasion of the building by insects, but do little toward eradicating nests in the walls of the building where the insects live and multiply.

It is an object of this invention to provide a novel fumigation system for exterminating insects in an existing building.

It is a particular object of this invention to provide an insect-extermination system which treats the problem at its source rather than its symptoms.

It is a further object of this invention to provide an insect-extermination system which can be installed in an existing building after it has been constructed.

It is a further object of this invention to provide an insect-extermination system whose component parts and whose installation are compatible with current practical construction practice.

Another object of this invention is to provide a built-in extermination system that can be fed with insecticide and operated by the occupant of the building being treated.

Another object of this invention is to provide a built-in extermination system which applies insecticide into the cavity between the interior and exterior walls of the building and not into the living and working spaces of the building.

Still another object of this invention is to provide an extermination system which applies insecticide into the voids in the walls of the building and not into the living or working spaces of the building.

Another object of this invention is to provide a fumigation system that applies fumigant into the voids in the walls of the building and which takes advantage of the ability of the active ingredients of the fumigant to diffuse through the walls into the places where insects nest.

SUMMARY OF THE INVENTION

The above and related objects of this invention are achieved by providing a novel fumigation system for exterminating insects in an existing building. This novel system is particularly adapted for installation in a common type of construction wherein an exterior wall of the building has a load bearig structural portion with two major surfaces, such as a concrete block wall; a self supporting interior wall consisting of plasterboard, attached to furring strips and spaced from and covering one major surface; and a sealer coating on the other major surface. The interior wall has at least one aperture for accessing the space formed between the interior and the exterior walls of the existing building.

The novel fumigation system comprises a tunnel device in and mating with said aperture, and means for introducing a fog of fumigant, under pressure, into the space behind the interior wall operatively connected to the tunnel device. By introducing fumigant as a fog into this space, the active ingredients of the fumigant travel to the insect nests in the wall where insects live and multiply. The blocks of the wall are known to be porous so that the active ingredients of the fumigant can penetrate into the porous structural portion. Since the fumigant is contained within the space between the interior wall and exterior wall, it is more efficiently and more sparingly dispensed because none of it is lost or blown away as in prior fumigation systems.

In one of the preferred embodiments of this invention, the novel system provides a plurality of apertures in the interior wall, each aperture having a mating tunnel device therein, each device being operatively connected to a tubular header. The header has means for introducing the fumigant under pressure therein, which means may be located in a closet, outside the building or within one of the rooms of the building. In another of the preferred embodiments of the novel system, each tunnel device is a separate fixture mounted in an aperture. The fixture preferably has a planar portion or plate adapted to rest on the surface of the interior wall, and a funnel portion adapted to extend through and fit the aperture. The fixture may also include means for performing another function, such as a hook for hanging a picture or a decorative cover hinged to the plate for concealing the aperture.

BRIEF DESCRIPTION OF THE DRAWINGS

FIGS. 3 and 4 are fragmentary sectional views of a plasterboard layer showing the aperture shape (FIG. 3) and a tunnel device installed therein (FIG. 4).

FIGS. 5, 6 and 7 are sectional views of three different embodiments of a tunnel device usable in one form of the novel system.

DETAILED DESCRIPTION OF THE INVENTION INCLUDING THE PREFERRED EMBODIMENTS

Figures 1, 2:
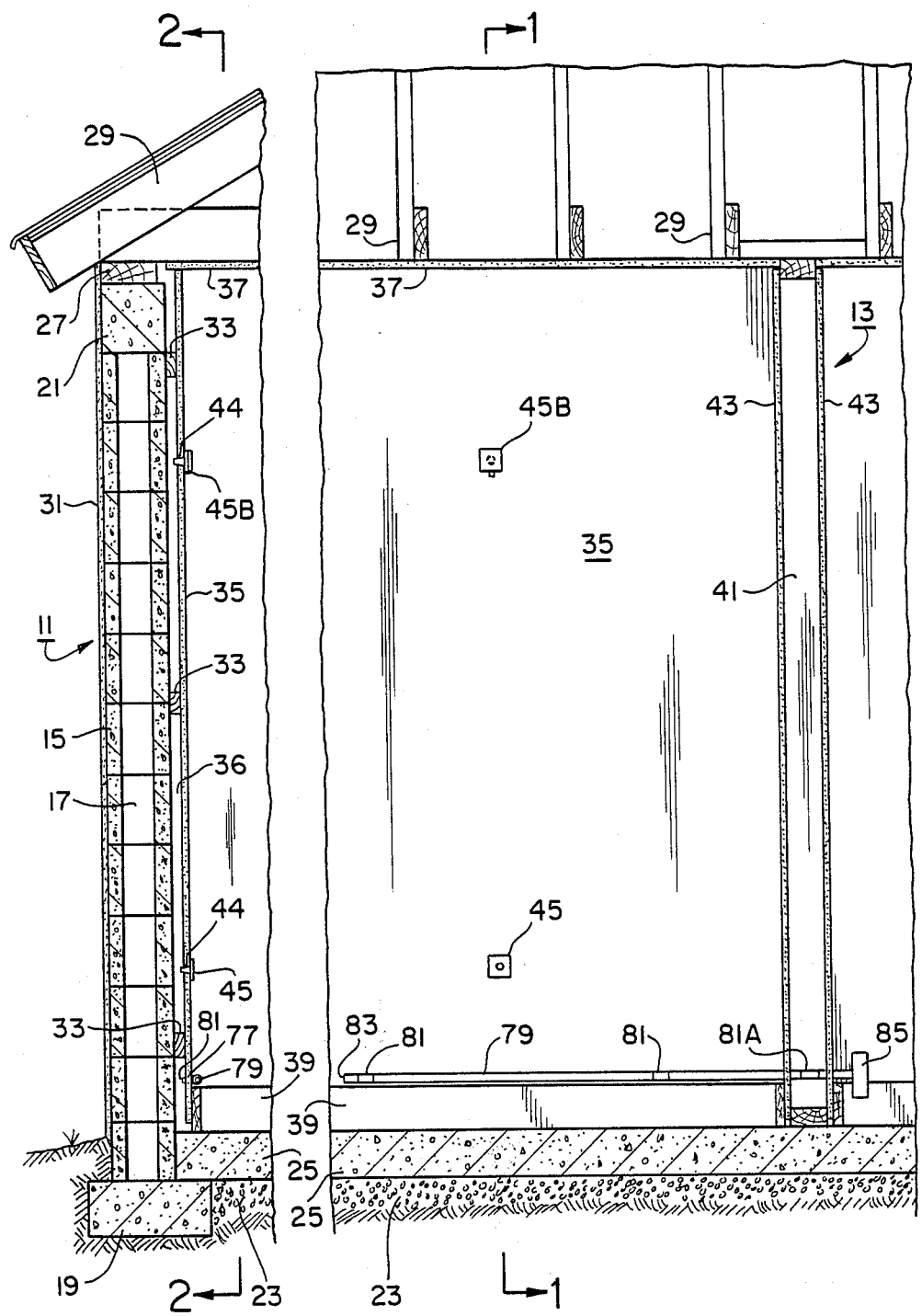
FIG. 1 is a sectional view of the wall of a building in which two embodiments have been installed.
FIG. 2 is an elevational view of the wall shown in FIG. 1 viewed along section line 2—2.

The following description of some of the preferred embodiments of the concept of this invention is made in reference to the accompanying figures. The individual elements of these figures may be present in more than one figure and, thus, they are assigned a common reference numeral for simplification of identification and understanding.

FIGS. 1 and 2 show a common construction of the corner of a building including an outside wall (11) and an inside wall (13). The outside or exterior wall (11) includes a load-bearing wall portion (15) which, in this case is a concrete block wall consisting of hollow, porous, masonry blocks, wherein the hollows thereof are aligned one above the other, providing extended empty spaces (17). The load-bearing portion (15) rests on a reinforced concrete footer (19) which ties the wall together at the bottom thereof and seals off the empty spaces (17) at their one end. A tie beam (21) extends along the top of the load-bearing portion (15). The tie beam (21) ties the wall together at the top thereof and seals off the empty spaces (17) at their other end. A layer of gravel (23) fills in the entire volume between the footers (19) of the building and a concrete floor (25) rests on the gravel layer (23) and the footer (19). A wooden plate (27) is bolted to the tie beam (21) and the roof trusses (29) rest on the plate (27). There is a sealer layer (31) of a special cement mix on the outer surface of the load-bearing wall portion (15). Furring strips (33) are nailed to the inner surface of the load-bearing portion (15) and an inside or interior wall (35) of plaster wallboard is attached to the furring strips (33), thereby forming a space (36) between the wallboard (35) and the exterior wall (11). A ceiling layer 937) of plaster wallboard attached to the bottom of the roof trusses. A wooden baseboard (39) attaches to the decorative layer around the base thereof. FIG. 2 also shows an inside partition wall in section, including wood studs (41) and facing layers (43) of plaster wallboard.

The interior wall (35) has tapered apertures (44) therein with the larger cross-section inward and the narrower cross-section outward toward the load-bearing wall portion (15) as shown in FIG. 3. A fixture (47) as shown in section in FIG. 5 is passed into the aperture as shown in FIG. 4. The fixture (45) includes a plate or planar portion (47) and an integral funnel or funnel portion (49) whose taper is matched by the wall aperture (45), narrowing from the plate towards its distal end. The outer surface of the funnel (49) has a plurality of upstanding barbs (51) or other anchor means which embed themselves in the wallboard (35), thereby holding the fixturein place. The fixture (45) is pressed in so that the back surface of the plate (47) is adjacent the face of the wallboard (35). The planar fixture (45) is preferred for use behind a piece of furniture or in a concealed portion of the building, such as a closet.

Where the fixture is to be used higher up on the wall, the hook fixture (45A), shown in FIG. 6, may be used in the same manner since it has all of the characteristics as the planar fixture (45). In addition, the fixture (45A) has a hook (53) integral with theplate (47) The hook (53) may be used to support a picture or other decorative item which can conceal the fixture (45A).

In an unconcealed location, a covered fixture (45B) shown in detail in FIG. 7 may be used. The covered fixture, shown also in FIGS. 1 and 2 has a hinge (55), a cover (57) and a holding clip (59) all integral with the plate (47). The covered fixture (45B) has all the characteristics of the planar fixture (45) and may be used in the same manner as described above.

Figure 8:
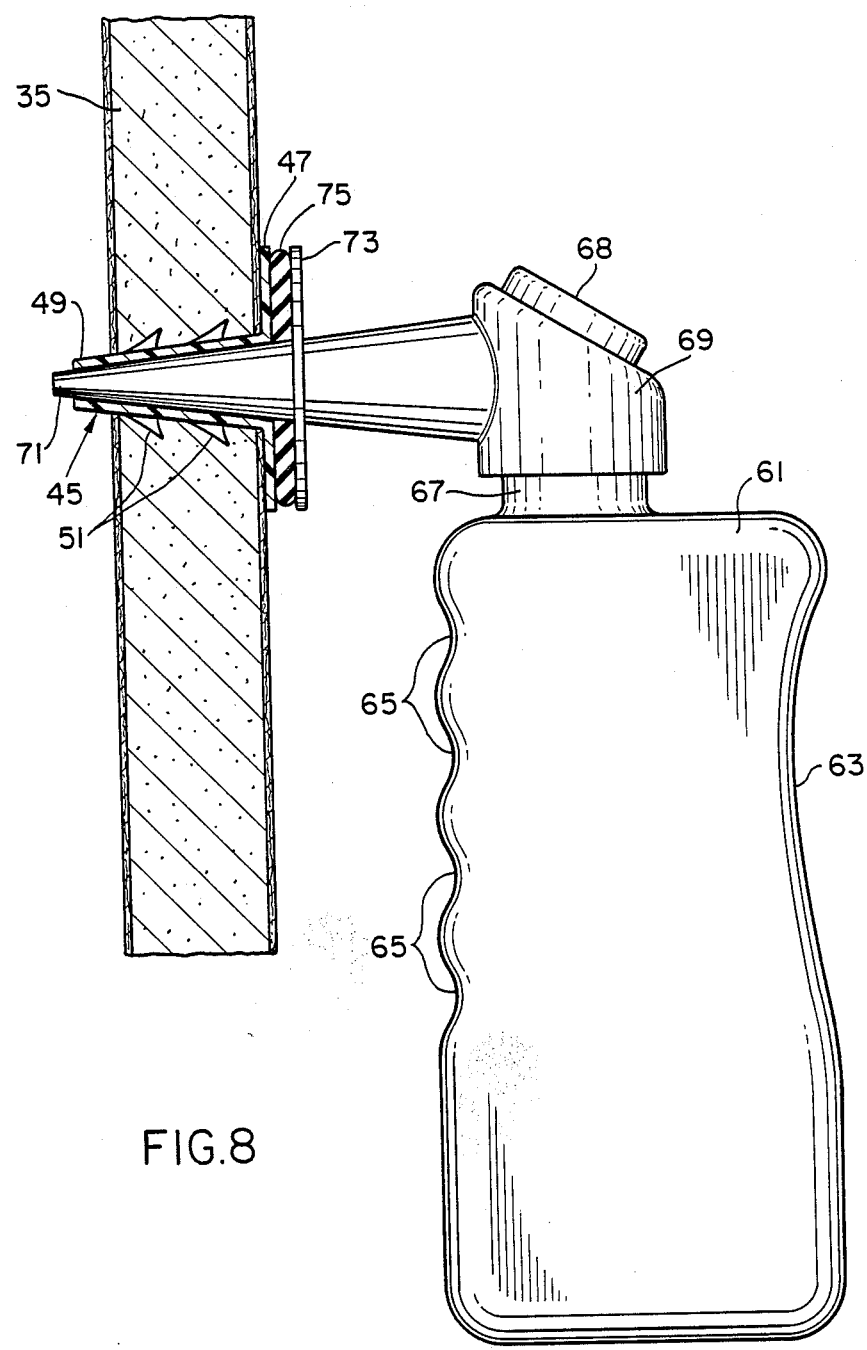
FIG. 8 is a fragmentary sectional view of the layer and device shown in FIG. 4 showing one means for introducing fumigant under pressure through the tunnel device into the space behind the interior wall.

FIG. 8 shows a modern slim-line fog container (61) having the exclusive palm imprint (63) and finger imprints (65) on its sides. The container (61) which holds the fumigant has a neck (67) and a cap (69) from which protrudes an extended nozzle (71). The cap (69) has a finger-operated valve (68) for controllably releasing fumigant from the container (61). The nozzle (71) carries an integral pressure ring (73) and a deformable gasket (75). In operation, with fumigant in the container (61), the nozzle (71) is pressed into the fixture (45) until the gasket (75) deforms between the ring (73) and the plate (47) thereby forming a seal. Then, the valve (68) in the cap (69) is depressed causing a fog of fumigant to issue from the nozzle (71) into the space (36) between the interior wall (35) and the load-bearing portion of the exterior wall.

An alternative arrangement of the novel system is shown in FIGS. 1 and 2. A plurality of spaced-apart apertures (77) are provided in the wallboard (35) and aligned just above the baseboard (39). A tube (79) having nozzles (81) therein placed at the same distance apart is mounted on the wallboard (35) above the baseboard (39) with the nozzles (81) extending through the apertures (77) The tube (79) has a closed end (83). The tube (79) extends through the partition wall (41) and terminates on the other side with a means (85) for connectign to a source of fumigant under pressure. There may be a nozzle (81A) inside the partition wall (41). The connecting means may be a coupling for connection to a large container or canister (not shown) containing fumigant under relatively high pressure. A container charged with fumigant can be installed on an interior wall and remain in coupling relationship with the aperture, and the homeowner simply energizes it when needed. Upon exhaustion of the contents of the cannister, it is removed and replaced. The cannister may be refilled or disposed of. As shown in FIG. 2, the connection means (85) is on the other side of the partition wall (41) which may be a closet. Alternatively, an outside wall may substitute for the partition wall (41) and the connection means may be outside the building. In either case, a canister with insecticide under pressure may be coupled to the connection means (85), with a manual control valve in the line. The canister may be left in place for long periods of time and the valve may be energized periodically (manually or by mechanical means) to fumigate the walls of the building. A timer may operate the valve on a regular basis if so desired. In a variation of this arrangement, the baseboard (39) may be hollow, tubular and have nozzles extending into apertures in the wallboard (35), and means for connection to a source of fumigant under pressure. Thereby, the functions of the tube (79) may be incorporated into the baseboard.

In another arrangement, particularly useful by commercial exterminators or pest control personnel, fixtures such as that shown in FIG. 5 may be placed low on the wall above the baseboard. A reservoir containing insecticide is carried by the person and applied through the fixture using a wand connected with a flexible hose to the reservoir and further having a nozzle, such as is shown in FIG. 8, which fits into the fixture. With such arrangement, the exterminator can enter the room and inject insecticide to a plurality of fixtures rapidly and in succession. The wand is essentially a long extension of the nozzle 71 shown in FIG. 8.

Several alternatives have been described above. One, several or all of the alternatives may be used in combination in any single building if so desired.

The foregoing figures and descriptions thereof are provided as illustrative of some of the preferred embodiments of the concepts of this invention. While these embodiments represent what is regarded as the best mode for the practice of this invention, they are not intended as delineating the scope of the concept, which is set forth in the following claims.

What is claimed is:

1. In a fumigation system adapted for installation into an existing building, comprising an exterior wall including a load-bearing structural portion having two opposed major surfaces, a self supporting interior wall attached to, spaced from and covering one of the major surfaces of said structural portion, and a sealer coating on the other major surface, said interior wall having at least one accessing wall aperture into the space between said exterior and said interior walls, said fumigation system comprising a tunnel device permanently installed and mated with said wall aperture, and means for introducing a fog of fumigant from a cannister of fumigant under pressure into said space operationally and detachably connected to said tunnel device, and wherein said tunnel device is a separate fixture mounted in said wall aperture, said fixture having a surface adapted to pressure seal the outer contour of a fumigant injection nozzle to said surface.

2. The system defined in claim 1, wherein said wall aperture is tapered towards said space and said tunnel device includes a plate having a plate aperture therein and a funnel integral with said plate and concentric with said plate aperture, said funnel extending from one side of said plate and having a larger cross-section adjacent said plate than at its distal end.

3. The system defined in claim 2, wherein said tunnel device has an additional functional characteristic.

4. The system defined in claim 3, wherein said tunnel device includes a hook upon which a decorative item may be hung.

5. The system defined in claim 3, wherein said tunnel device includes a cover over said aperture to conceal said tunnel device from view, said cover being hinged to said planar portion.

6. The system defined in claim 1, wherein said fumigant introducing means comprises a pressure resistant container having a tapered fumigant injection nozzle which, when pressed into said tapered surface of said tunnel device, provides a pressure seal therebetween, and a valve for releasing fumigant from said container through said nozzle.

7. The system defined in claim 6 wherein said container has its sides contoured to fit the fingers and palm of a user's hand.

8. A tunnel device for use in the system defined in claim 1, said device comprising a planar portion having a plate aperture therein, a funnel portion integral with the periphery of said plate aperture and extending back from one side of said planar portion, the cross-section of said funnel portion decreasing with distance from said planar portion and adapted to mate with a tapered wall aperture.

9. The device defined in claim 8, wherein the external surface of said funnel portion has upstanding barbs thereon for embedding in said tapered wall aperture.

10. The device defined in claim 8, including a hook integral with said planar portion and extending forward from the other side of said planar portion, and no part of said hook extends back from said one side.

11. The device defined in claim 8, including a planar decorative cover covering the entire other side of said planar portion, said cover being hinged to one edge of said planar portion.

12. The system defined in claim 6, wherein said nozzle includes an elongated wand and a flexible hose attached between said wand and said valve.

* * * * *